United States Patent

[11] 3,617,319

| [72] | Inventors | Gerard Henri Sadran<br>Paris;<br>Louise Marie Assaud, Montelimar, both of France |
|---|---|---|
| [21] | Appl. No. | 747,099 |
| [22] | Filed | July 24, 1968 |
| [45] | Patented | Nov. 2, 1971 |
| [73] | Assignee | Societe Anonyme: Ciments Lafarge<br>Paris, France |
| [32] | Priority | July 31, 1967 |
| [33] | | France |
| [31] | | 116,376 |

[54] HIGHLY REFRACTORY ALUMINOUS CEMENT AND PROCESS FOR ITS MANUFACTURE
2 Claims, No Drawings

| [52] | U.S. Cl. | 106/104 |
|---|---|---|
| [51] | Int. Cl. | C04b 7/32 |
| [50] | Field of Search | 106/104 |

[56] References Cited
UNITED STATES PATENTS

| 2,845,360 | 7/1958 | King et al. | 106/104 |
|---|---|---|---|
| 2,407,135 | 9/1946 | Clark | 106/104 |
| 1,716,527 | 6/1929 | Martin | 106/104 |

Primary Examiner—James E. Poer
Assistant Examiner—W. T. Scott
Attorney—Brumbaugh, Graves, Donohue, & Raymond ABSTRACT: A highly refractory aluminous cement which comprises about 60% clinker, about 40% $Al_2O_3$, about 2% $AlNa_3F_6$ and about 0.18% to 2.5% sodium citrate and has a grain size distribution in which about 90% of the particles are under 30 microns. The clinker is formed by burning $Al_2O_3$ (98% purity) and $CaCO_3$ (99% purity). It contains a mixture of $CaO \cdot Al_2O_3$ and $CaO \cdot 2Al_2O_3$ in the ratio of approximately 1:1. The clinker is crushed, and the required amounts of $Al_2O_3$, $AlNa_3F_6$ and sodium citrate are added. Final crushing reduces the size of the desired dimensions.

HIGHLY REFRACTORY ALUMINOUS CEMENT AND PROCESS FOR ITS MANUFACTURE

This invention concerns, as a new industrial product, a highly refractory aluminous cement comprising essentially:
Clinker—from 59.5 to 69.5%
$Al_2O_3$ from 38 to 40%
Al $Na_3F_6$—from 1.5 to 2.5%
Na citrate—from 0.18 to 2.5%
which shows a grain size distribution of at least 90 percent, (according to French standard P. 15–443) at 30 $\mu$.

The invention further concerns a process for its manufacture and also relates, to mortars and concretes obtained from this cement, as well as to their various applications.

It is known that aluminous cements can be manufactured either through clinkering in a rotary kiln, like Portland cement, or through fusion in a draught furnace. In this latter case, the impurities supplied by the bauxite, one of the raw materials, and in particular iron compounds, favor this fusion. But what is an advantage for the manufacture of melted cements becomes a drawback in refractory applications, and due to the presence of these "melting" components in the binder, its use always remains limited as to the temperature range.

This, therefore, has led to the replacement of the natural raw materials with pure products i.e., alumina and limestone, in the formation of the crude mix, followed by burning so as to obtain calcium dialuminate $CaO \cdot 2O_3$), whose melting point is 1,720° C., as opposed to monocalcium aluminate ($CaO \cdot Al_2O_3$), whose melting point is 1,600° C.

One would assume that to produce calcium dialuminate ($CaO \cdot 2Al_2O_3$) it would be possible to burn stoichiometric amounts of $CaCO_3$ and $Al_2O_3$ according to the following formula:

$$CaCO_3 + Al_2O_3 \rightarrow CaO \cdot 2Al_2O_3 + CO_2$$

Tests carried out by applicant have made it actually possible to establish that burning of a crude mix, consisting of 62.7 percent $Al_2O_3$ (98 percent pure) and 37.3 percent $CaCO_3$ (99 percent pure), does not lead in any case, whatever the burning temperature may be, to pure $CaO \cdot 2Al_2O_3$. On the contrary, a mixture of $CaO \cdot Al_2O_3 + CaO \cdot 2Al_2O_3$ is always obtained in a ratio of approximately 50/50 in which the lime derived from the calcium carbonate is entirely combined, provided the temperature and burning time have been suitably chosen.

Mortars obtained with such a binder and refractory granular materials such as chamotte, roasted bauxite, corhardt and magnesia, are more highly refractory by approximately 100°–200° C. than melted aluminous cement mortars; they show a better resistance to thermal shock, have a better cohesion after heating at 1,000° C., and are more resistant to compression in the cold.

Aluminous cement, according to the invention, consists essentially of the four following components:
Clinker—from 59.5 to 60.5%
$Al_2O_3$ from 38 to 40%
Al $Na_3F_6$—from 1.5 to 2.5%
Na citrate—from 0.18 to 2.5%
which shows a grain size distribution of at least 90 percent, (according to French standard P. 15–443) at 30 $\mu$.

The process of preparation of this cement consists
in Clinkering in a rotary kiln at a temperature ranging from about 1,550° to 1,570° C., a crude consisting of $Al_2O_3$ (56 to 57 percent) and $CaCO_3$ (42 to 43 percent), so as to obtain a clinker having the following composition:
$SiO_2$—below about 0.3%
$Al_2O_3$ from about 69 to 71%, preferably 70.0%
$Fe_2O_3$ below about 0.3%
CaO—from about 28 to 3%, preferably 29.0%
Loss on firing and others: below about 0.5%
whereby said clinker provides a ratio of $CaO \cdot Al_2O_3/CaO \cdot 2Al_2O_3$ substantially equal to 1 in adding to the milled clinker the required quantities of about 38 to 40 percent of alumina $Al_2O_3$, about 1.5 to 2.5 percent of cryolite $AlNa_3F_6$ and from about 0.18 to 0.22 percent of sodium citrate, and milling the mix so that 90 percent of its particles are below 30 $\mu$ in size.

It should be noted that all precautions must be taken to eliminate any traces of $12CaO \cdot 7Al_2O_3$, from the clinker, for this aluminate imparts to the finished product undesirable setting characteristics, due to the stiffening which it causes.

In order to impart to the finished product the homogeneity and fineness required according to the invention, premilling of the clinker is carried out leading to a powder of which 65–70 percent of the particles are below 30 $\mu$ in size, followed by a second milling imparting to the clinker its ultimate fineness so that a very fine and very homogenous mix is then obtained of the four binder components.

From the point of view of results given by a mortar or concrete from the highly refractory aluminous cement according to the invention, it should be noted that the mixing water amounts to a maximum of 21 percent and that initiation of setting of the mortar occurs after 1 hour. Furthermore, compressive strengths in the cold are as follows:

| 6 h | 24 h | 7 d |
|---|---|---|
| 60 bars | 500 bars | 1,000 bars |

Compressive strength, after heating at 1,400° C. is above 1,000 bars.

It has a heat resistivity, as a pure paste, of 1,780° C.

These exclusive properties of the finished cement, which is a high quality refractory material, result from the additions made to the chosen clinker, subjected to treatment under the above-mentioned conditions of the invention:

Alumina is a very fine specially manufactured roasted product (Blaine specific surface, minimum of about 6,000 cm.²/g.), which only requires a maximum of 36 percent mixing water and is soda free (total $Na_2O$ 0.15 percent). It is designed to react, when applying the refractory concrete, with the aluminates formed during hydration, in order to provide the anhydrous aluminates $CaO \cdot 2Al_2O_3$ and $CaO \cdot 6Al_2O_3$.

Cryolite (Al $Na_3F_6$) helps to create ceramic bonds upon application, its "melting" action favoring the appearance of liquid phases in which reaction exchanges occur between aggregates and binders.

Sodium citrate acts as a fluidizing agent and prevents the stiffening process.

We claim:
1. A highly refractory aluminous cement which consists essentially of an admixture of:
    a. about 59.5–60.5 percent by weight of ground clinker which is a mixture of $CaO \cdot Al_2$ 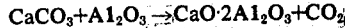 and $CaO \cdot$ ratio of about 1:1;
    b. from about 38 to about 40 percent by weight Al
    c. from about 1.5 to about 2.5 percent by weight cryolite; and
    d. from about 0.18–2.5 percent by weight sodium citrate, the cement having a grain size distribution in which about 90 percent of the particles are smaller than about 30 microns.

2. A process for the preparation of a highly refractory aluminous cement which consists essentially of the steps of:
    a. clinkering a crude mix that consists essentially of sufficient amounts of $Al_2O_3$ having a purity of about 98 percent by weight and calcium carbonate having a purity of approximately 99 percent to form a clinker having an $SiO_2$ content of below about 0.3 percent by weight, and having a $Fe_2O_3$ content below about 0.3 percent by weight, an $Al_2O_3$ content from about 69 to about 71 percent by weight, and a CaO content of from about 28 percent to about 30 percent by weight, said clinker having a ratio of $CaO \cdot Al_2O_3$ to $CaO \cdot 2Al_2O_3$ which is substantially equal to 1;
    b. milling the clinker;

c. adding to the milled clinker, $Al_2O_3$, $AlNa_3F_6$ and sodium citrate to form a mix containing
   Clinker—from 59.5 to 60.5% 40%
   $Al_2O_3$—from 38 to 40%
   $AlNa_3F_6$—from 1.5 to 2.5%
   Na citrate—from 0.18 to 2.5%; and
d. milling the mix obtained thereby so that about 90 of the particles are smaller than about 30 microns in size.

PO-1050
(5/69)

UNITED STATES PATENT OFFICE
CERTIFICATE OF CORRECTION

Patent No. 3,617,319          Dated November 2, 1971

Inventor(s) Gerard Henri Sadran and Louise Marie Assaud

It is certified that error appears in the above-identified patent and that said Letters Patent are hereby corrected as shown below:

Column 1, line 6, "from 59.5 to 69.5%" should read --from 59.5 to 60.5%--; Column 1, line 27, "($CaO \cdot 2O_3$)" should read --($CaO \cdot 2Al_2O_3$)--; Column 1, line 35, "$CaCO_3 + Al_2O_3 \rightarrow CaO \cdot 2Al_2O_3 + CO_2$" should read --$CaCO_3 + 2Al_2O_3 \rightarrow CaO \cdot 2Al_2O_3 + CO_2$--; Column 1, line 68, "28 to 3%" should read --28 to 30%--;

Column 2, line 8, "premilling" should read --pre-milling--; Column 2, line 53, "$CaO \cdot Al_2$ and $CaO \cdot$" should read --$CaO \cdot Al_2O_3$ and $CaO \cdot 2Al_2O_3$--; Column 2, line 55, change "Al" to --$Al_2O_3$--;

Column 3, line 3, after "60.5%" delete "40%"; Column 3, line 4, change "$Al_2O_3a$" to --$Al_2O_3$--;

Column 4, line 3, change "90" to --90%--.

Signed and sealed this 30th day of May 1972.

(SEAL)
Attest:

EDWARD M. FLETCHER, JR.          ROBERT GOTTSCHALK
Attesting Officer          Commissioner of Patents